United States Patent [19]

Aoki et al.

[11] Patent Number: 4,575,153
[45] Date of Patent: Mar. 11, 1986

[54] BACK FRAME IN A SEAT BACK FOR A VEHICLE SEAT

[75] Inventors: Akira Aoki, Akishima; Hideo Shimbori, Tokyo, both of Japan

[73] Assignee: Tachikawa Spring Co. Ltd., Japan

[21] Appl. No.: 606,415

[22] Filed: May 2, 1984

[51] Int. Cl.$^4$ ............................................. A47C 7/02
[52] U.S. Cl. .............................. 297/452; 248/188.91; 297/354; 297/355
[58] Field of Search ...................... 297/452, 354, 355; 16/111 A; 248/188.91, 903

[56] References Cited

U.S. PATENT DOCUMENTS 3,037,812  6/1962  Monroe ............................... 297/355
4,040,660  8/1977  Barecki ............................... 297/354
4,200,331  4/1980  Uchida ................................ 297/355

FOREIGN PATENT DOCUMENTS 0048294  3/1982  European Pat. Off. ............ 297/354

Primary Examiner—James T. McCall
Attorney, Agent, or Firm—Cushman, Darby & Cushman

[57] ABSTRACT

A back frame forming a part of a seat back of a seat for use in a vehicle such as an automobile is disclosed. The back frame is extended at its lower end(s) with a reinforcement portion and this reinforcement portion is attached to the inside surface of a lower bracket of a reclining adjuster mounted to a cushion frame, so that any displacement loads applied to the back frame can be shared in part by the lower bracket to improve the strength and rigidity of both of the upper bracket of the reclining adjuster and the back frame.

3 Claims, 7 Drawing Figures

BACK FRAME IN A SEAT BACK FOR A VEHICLE SEAT

BACKGROUND OF THE INVENTION

1. Field of the Invention

The present invention relates to a back frame in a seat back for a vehicle seat, and more particularly to an improved back frame which is connected to a cushion frame by means of a reclining adjuster.

2. Description of the Prior Art

Conventionally, a back frame of this type, as shown in FIG. 1 and designated by (A'), includes a lower end to which an upper bracket (b1) of a reclining adjuster (B) is fixed. In this figure, reference (a1) designates an upper cross member of the back frame (A'), (a2) stands for a lower cross member of the same, and (a3) represents a free hinge of the same rotatably mounted to a cushion frame (C).

With such structure, when an eccentric load of W is given to the back frame (A') on the free hinge (a3) side of its upper cross member (a1), a torsional moment in the shown F1 direction as well as a load in the illustrated F2 direction are applied to the lower cross member (a2) of the back frame (A'). For this reason, in such prior art device, it is necessary to increase the strength of both of materials of the back frame (A') and the upper bracket (b1) of the reclining adjuster (B) to be connected with this back frame, which provides a disadvantage in reducing the weight of the back frame.

SUMMARY OF THE INVENTION

Accordingly, the present invention aims at eliminating the above mentioned drawback in the conventional back frame. It is a primary object of the invention to provide an improved back frame which has an enhanced rigidity and a simplified structure as well as which is easy to mount. Another object of the invention is to provide a lighter back frame than the conventional one.

In this specification, there are illustrated three typical embodiments to show the principles of the present invention.

In brief, in order to attain these objects, according to the invention, a back frame body includes a lower end extended with a reinforcement portion and this reinforcement portion is juxaposed to and abutted against the inner side of a lower braceket of a reclining adjuster, whereby any loads applied to a lower cross member of the back frame can be partially borne by the lower bracket. As a result of this, the back frame and the upper bracket of the reclining adjuster can be enhanced in both strength and rigidity respectively.

In order to provide the above-mentioned reinforcement portion in the back frame of the invention, a pipe longer in length than that used in the prior art device is selected and the lower end of this longer pipe is collapsed using a press.

In another aspect of the invention, such reinforcement portion can also be formed in the same configuration as that of a free hinge forming one end of the back frame of the invention. In this case, two parallel or right and left back frames can be used in common.

Further, according to the invention, it is also possible to provide two reclining adjusters on the right and left of the back frame body respectively. In this structure, the back frame body is extended at its both ends with respective reinforcement portions and then these reinforcement portions are respectively juxtaposed to and abutted against the respective inner sides of the lower brackets of the reclining adjusters.

The above and other related objects and features of the invention will be apparent from a reading of the following description and claims taken in connection with the accompanying drawings.

DETAILED DESCRIPTION OF THE PREFERRED EMBODIMENTS OF THE INVENTION

Figure 1:
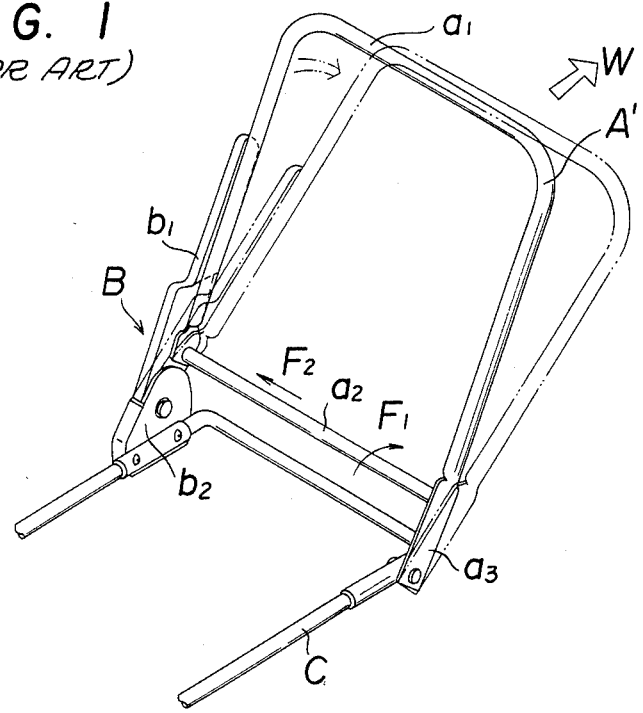
FIG. 1 is a perspective view of a conventional back frame, illustrating a state in which it is mounted to a cushion frame.
Figure 2:
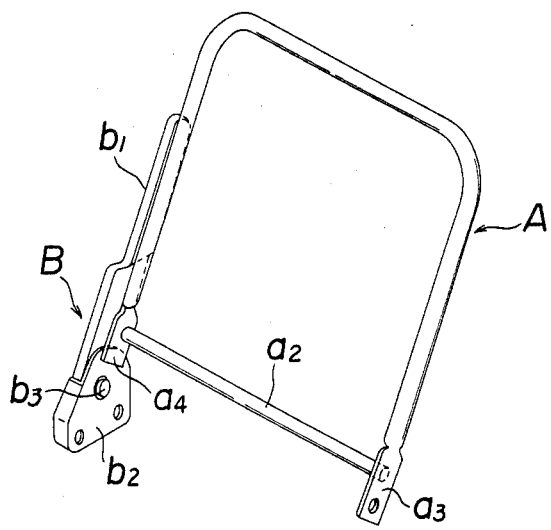
FIG. 2 is a perspective view of a first embodiment of the invention.
Figure 3:
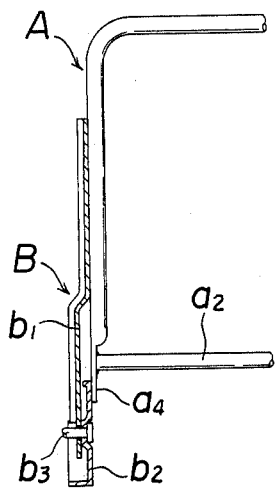
FIG. 3 is a sectional view of main portions of the first embodiment of the invention.

FIGS. 2 and 3 illustrate a first embodiment of the invention, and in these figures reference character (A) designates a back frame body formed by bending a pipe into a U-shaped configuration and then by welding a lower cross member (a2) integrally to this U-shaped pipe. This back frame (A) is provided at its one end with a free hinge (a3), while it is extended at its opposite free end with a reinforcement portion (a4). The reinforcement portion (a4), as with the free hinge (a3), is produced by collapsing the pipe to form the back frame body (A) at its end using a press, and is then juxtaposed to and abutted against the upper inside surface of a lower braceket (b2) of a reclining adjuster (B). The reclining adjuster (B) is a conventional one which comprises an upper bracket (b1) directly fixed to the back frame body (A) by welding or the like, a lower bracket (b2) to be fixed to a cushion frame (C), and a hinge pin (b3) for pivotally mounting these two brackets (b1) and (b2).

With this structure, the lower bracket (b2) of the reclining adjuster (B) is sandwiched in between the upper bracket (b1) and the reinforcement portion (a4) of the back frame body (A) and thus it is capable of absorbing any displacement movement due to loads applied to the back frame body (A).

Figure 4:
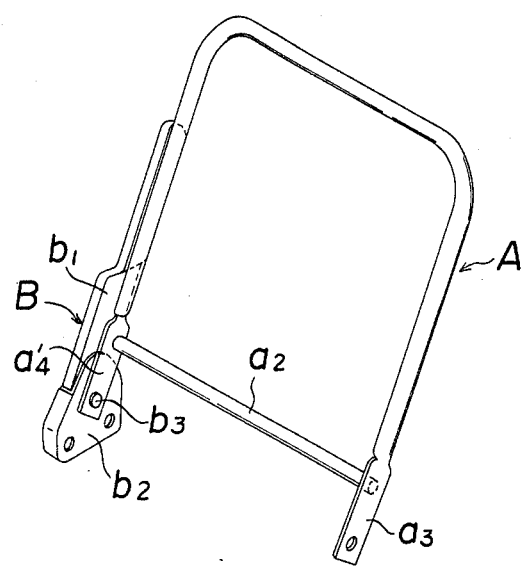
FIG. 4 is a perspective view of a second embodiment of the invention.
Figure 5:
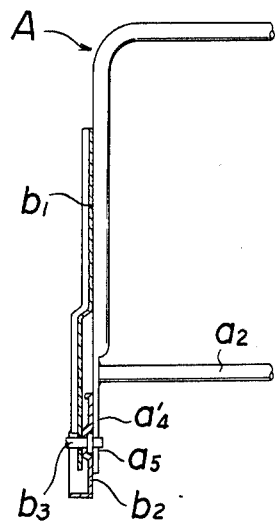
FIG. 5 is a sectional view of main portions of the second embodiment of the invention.

FIGS. 4 and 5 illustrate a second embodiment of the invention in which a reinforcement portion (a4') is formed as the same as the free hinge (a3) and is rotatably mounted to the reclining adjuster (B) by means of the hinge pin (b3). According to this embodiment, two parallel or right and left back frames can be advantageously used in common. In these figures, reference (a5) represents a through-bore formed in the reinforcement portion (a4) for insertion of the hinge pin (b3).

Figure 6:
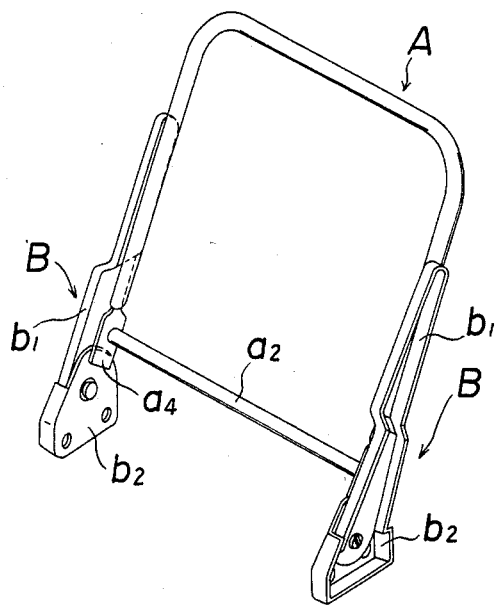
FIG. 6 is a perspective view of a third embodiment of the invention.
Figure 7:
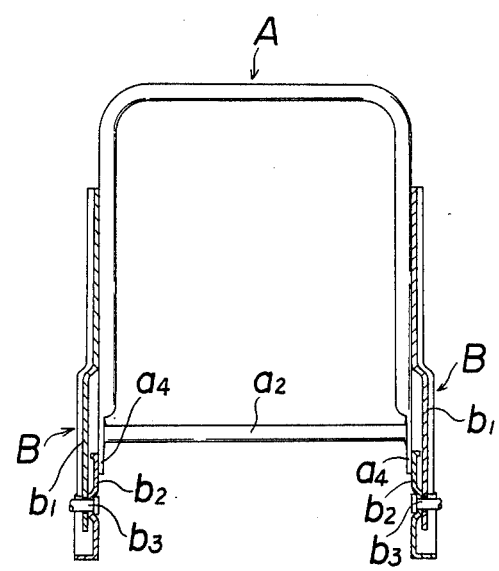
FIG. 7 is a sectional view of main portions of the third embodiment of the invention.

FIGS. 6 and 7 illustrate a third embodiment of the invention in which two reclining adjusters (B)(B) are respectively arranged on the right and left of a back frame. In this embodiment again, as in the prior two embodiments of the invention, reinforcement portions (a4)(a4) are respectively juxtaposed to and abutted against the inside surfaces of the lower brackets (b2)(b2) of the reclining adjusters (B)(B).

As can be easily understood from the foregoing description, according to the invention, the reinforcement portion of the back frame is adapted to interfere with the lower bracket of the reclining adjuster just at the time when any loads are applied to the back frame and start to deform it. In other words, the loads applied to the back frame can be shared in part by the lower bracket of the reclining adjuster, which means that it is possible to increase the strength and rigidity of materials of both the upper braceket of the reclining adjuster and the back frame. As a result of this, a thinner material can be used to produce a pipe or the like of which the back frame is formed, and thus the weight of the back frame can be reduced accordingly.

Also, since the present invention employs a simple manner in which the back frame is extended in part to form the reinforcement portion and then the reinforcement portion is juxtaposed to and abutted against the inside surface of the lower bracket of the reclining adjuster, the back frame constructed in accordance with the invention is simple in structure, easy to mount and can be supplied at low costs.

What is claimed is:

1. A back frame for a vehicle seat, comprising:
a generally inverted U-shaped back frame body having a pair of spaced end portions, at least one of said end portions including a reinforcing member, said frame body also including a transverse cross member rigidly interconnected between said reinforcing member and the other of said end portions;
at least one lower bracket adapted to being coupled to a cushion frame body;
an upper bracket rigidly fixed to said one end portion and extending parallel to said reinforcing member, said upper bracket and said reinforcing member together establishing a space therebetween; wherein
a portion of said lower bracket extends into said space so as to be sandwiched between said upper bracket and said reinforcing member so that said reinforcing member is in juxtaposed relationship to an inner surface of said lower bracket portion; and
reclining adjustment means for pivotally coupling at least said upper bracket to said lower bracket to permit relative pivotal movements thereof, wherein
said cross member and said reinforcing member together provide the means for transferring, to said lower bracket portion, at least a part of a load applied to said back frame body by virtue of said reinforcing member being juxtaposed with said lower bracket portion and by virtue of said rigid interconnection of said cross member between said reinforcing member and said other end portion of said back frame body.

2. A back frame as in claim 1 said reclining adjustment means is also pivotally coupled to said reinforcement member.

3. A back frame as in claim 1 wherein said other end portion includes a second reinforcement member, said back frame further comprising second upper and lower brackets, said second reinforcement member being juxtaposed to a portion of said second lower bracket sandwiched between said reinforcement member and said second upper bracket.

* * * * *